(12) United States Patent
Kerpash, Sr.

(10) Patent No.: US 6,247,277 B1
(45) Date of Patent: Jun. 19, 2001

(54) GRAIN STORAGE SAFETY NET SYSTEM AND METHOD

(76) Inventor: Robert S. Kerpash, Sr., 1104 Bohemian Church Rd., Troy, MO (US) 63379

(*) Notice: Subject to any disclaimer, the term of this patent is extended or adjusted under 35 U.S.C. 154(b) by 0 days.

(21) Appl. No.: 09/069,925

(22) Filed: Apr. 30, 1998

(51) Int. Cl.⁷ .............................. E04H 5/08; E04G 23/00
(52) U.S. Cl. .......................................... 52/192; 52/745.01
(58) Field of Search ........................ 52/192, 197, 741.1, 52/745.01, 193, 194, 195, 196; 210/473, 474, 477, 482, 499; 245/1, 2, 3

(56) References Cited

U.S. PATENT DOCUMENTS

| | | |
|---|---|---|
| 360,082 | 3/1887 | Bonner . |
| 396,491 | 1/1989 | Hunter . |
| 1,216,112 * | 2/1917 | Greven ................................. 210/477 |
| 2,123,268 | 7/1938 | Young . |
| 3,504,765 | 4/1970 | Sullivan . |
| 4,718,208 * | 1/1988 | Fons ........................................ 52/192 |
| 5,009,052 * | 4/1991 | Welch ................................ 52/745.01 |
| 5,167,299 | 12/1992 | Nusbaum . |
| 5,406,764 | 4/1995 | Van Auken et al. . |
| 5,722,197 * | 3/1998 | Albritton .................................. 43/55 |

OTHER PUBLICATIONS

Sales Literature of, Brownie Manufacturing, Waverly, Nebraska, Bin & Roof Stairs Ladder and Safety Cage, exact publication date unknown, but at least one year prior to the filing of the present application.

* cited by examiner

Primary Examiner—Michael Safavi
(74) Attorney, Agent, or Firm—Shughart Thomson & Kilroy P.C.

(57) ABSTRACT

A grain storage safety net system and method is designed to reduce or prevent accidents involving grain carts and grain storage bins. The safety net system includes a strong and durable wide mesh netting which is secured to the inside periphery of either a grain cart or grain bin via a plurality of anchors. The netting thus blankets an upper ingress opening of the cart or bin, with the wide mesh netting allowing the ingress of grain while preventing human entry therein.

9 Claims, 2 Drawing Sheets

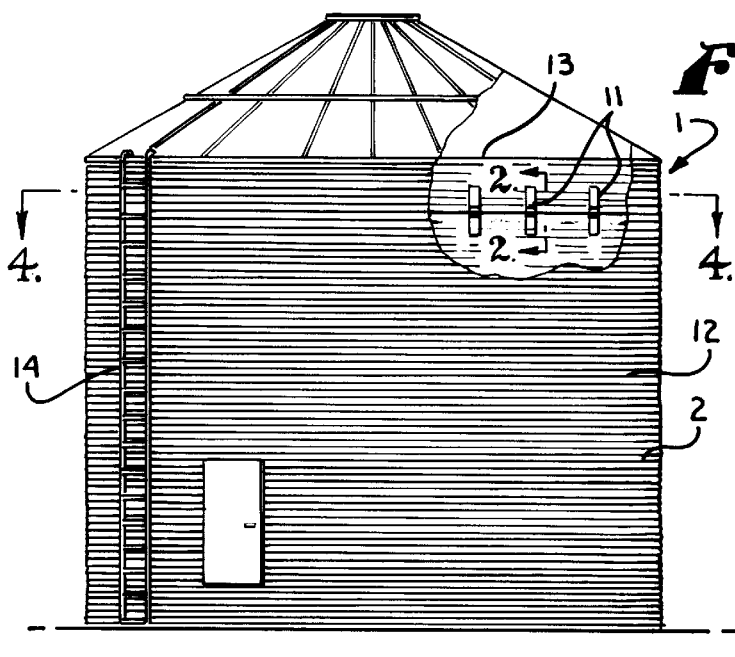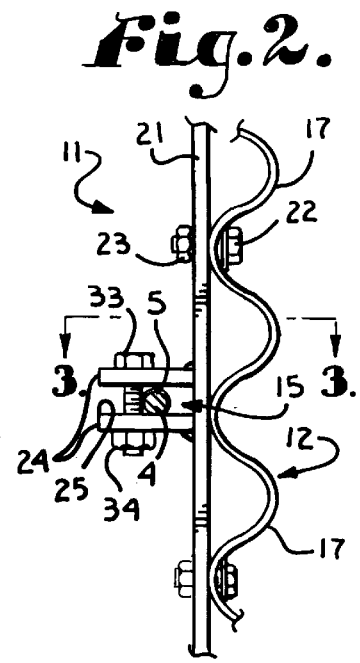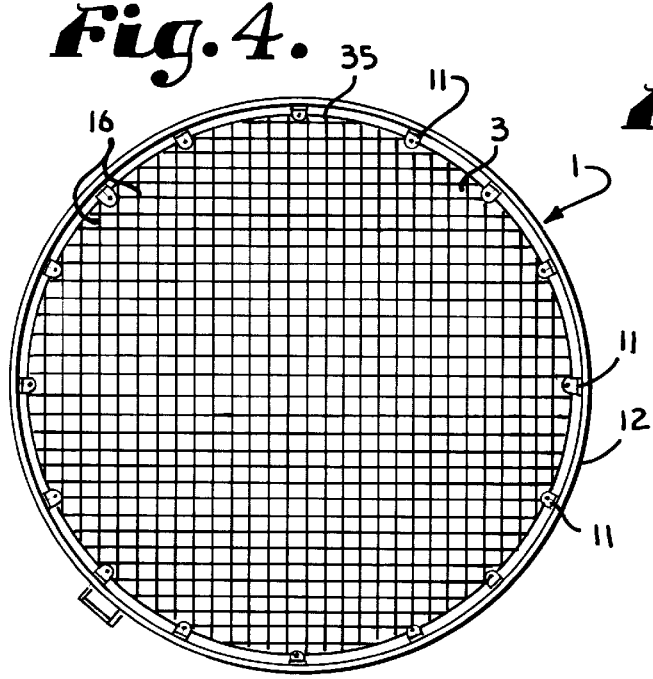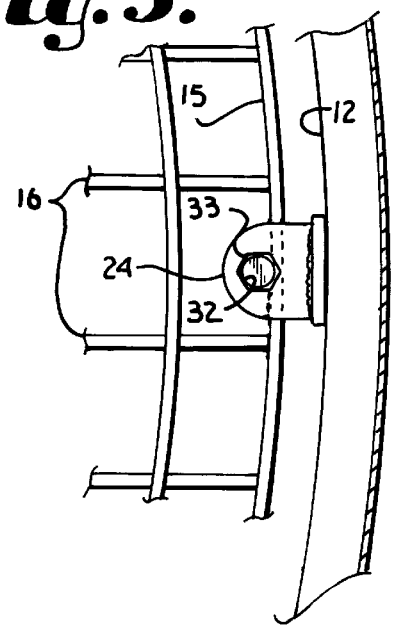

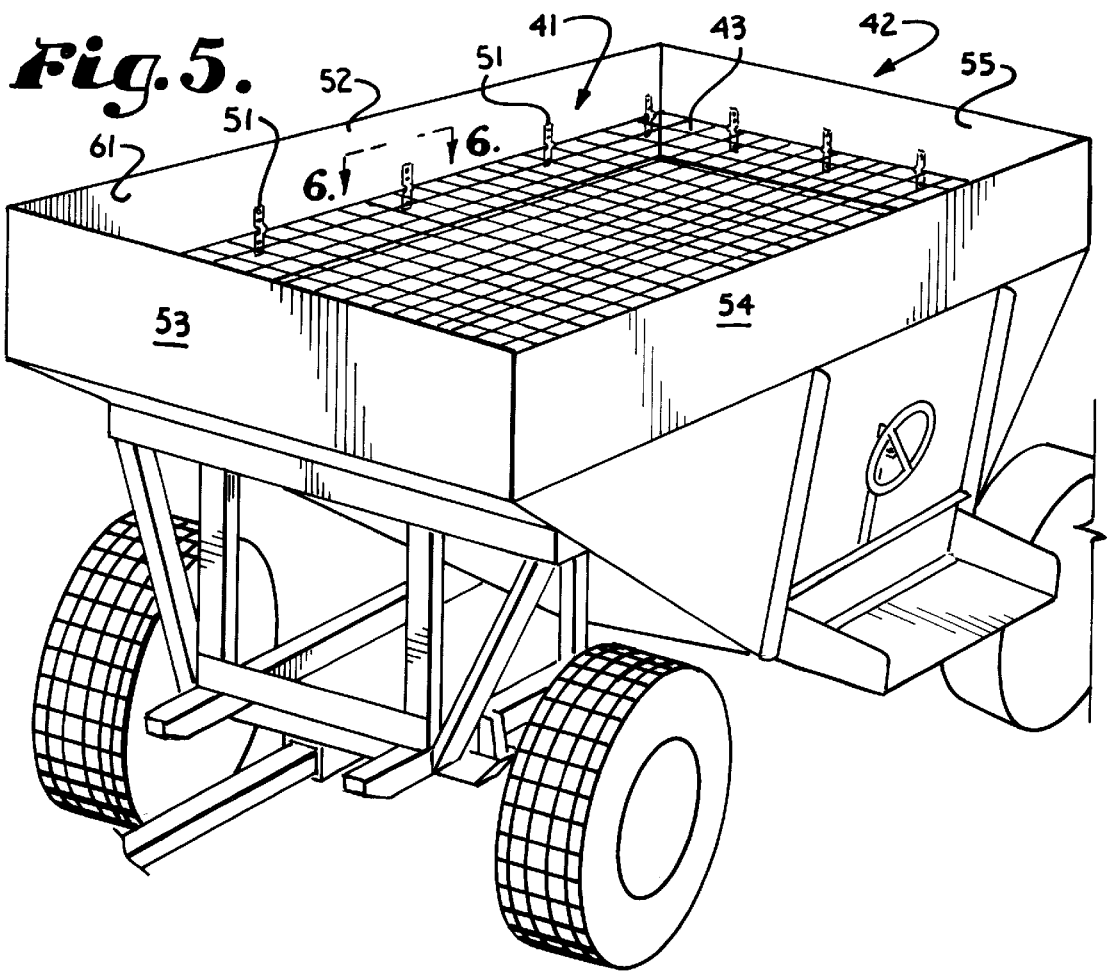
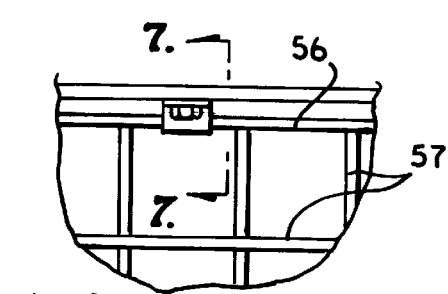
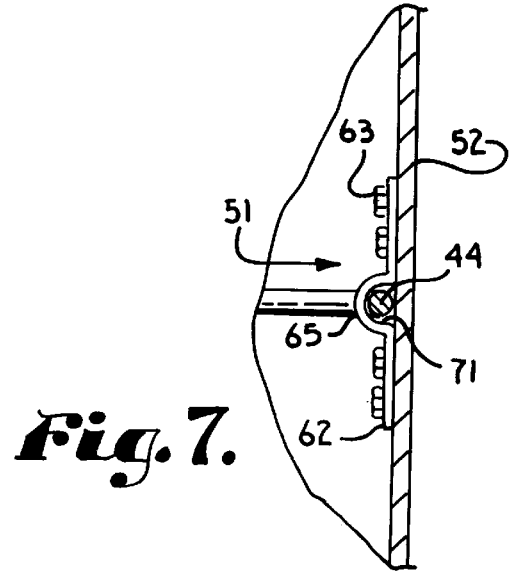

GRAIN STORAGE SAFETY NET SYSTEM AND METHOD

FIELD OF THE INVENTION

The present invention relates to a safety net system and method for grain bins and grain carts, and, more particularly, to such a safety net system and method in which a large mesh safety net is attached to anchors positioned along the inside perimeter walls of a grain bin or grain cart such that the net extends over the entire grain storage area of the bin or cart to allow grain ingress while preventing a person from entering the grain storage area.

BACKGROUND OF THE INVENTION

Grain storage structures, including mobile grain carts and stationary grain storage bins are one of the leading causes of farm deaths in the United States. In 1992, the National Institute for Occupational Safety and Health (NIOSH) reported 9 fatalities in the United States from getting suffocated in grain or caught in grain augers in a bin or cart. The State of Illinois alone reported 22 deaths from grain bins, as well as an additional number from grain carts, in the years from 1986–1994. There are a number of causes for these accidents.

When grain is stored with a relatively high moisture content, the grain tends to cake or crust at the surface and form a "bridge" of caked grain which can extend all of the way between the sidewalls of the storage bin or cart. Such bridged grain is extremely hazardous because it prevents grain from flowing into the bin or cart and hides underlying pockets of air beneath the bridge. Farmers will often walk on the bridged grain in an effort to break it up and fall through the bridge, thus getting engulfed in the grain.

Farm workers are also often buried by stored grain as the grain is being emptied from the bottom of the bin or cart. The flowing grain acts much like quick sand, pulling the worker completely under the grain surface. According to NIOSH, forces created by a grain auger unloading grain are so great that, once a person is buried up to the waist, they stand virtually no chance of escaping from the auger force, even with the aid of a safety rope. The force required to remove a person buried to the chest in grain can exceed 2,000 pounds, i.e. about the weight of a small car. Typical unloading rates will fully bury an adult person within one minute. High capacity conveyors can move 5,000 bushels of grain in an hour. At these flow rates, a six foot adult will be totally buried in 15 seconds.

The risk of suffocation increases as grain ages in a bin due to the emission of carbon dioxide, which displaces the oxygen supply in the bin. Thus, even if a worker is not buried completely, he can suffocate due to the lack of oxygen in the bin.

NIOSH recommends the following steps to prevent such accidents, 1) Break up crusts of grain from outside the bin; 2) Avoid entering storage bins or grain carts; 3) If you must enter a bin or cart, stay above the material at all times, assume that all bridged material is unstable, wear safety harnesses with properly fastened life lines, stop the flow of grain prior to entering, and turn on any ventilators It is clear, then, that a need exists for improved safety equipment for grain storage bins and grain carts. Such equipment should preferably be economical and easily installed, yet reliable, should not interfere with operation of the grain cart or bin and should be passive and not easily defeated in purpose.

SUMMARY OF THE INVENTION

The present invention is a grain storage safety net system and method which is designed to reduce or prevent accidents involving grain carts and grain storage bins. The safety net system is a wide mesh netting which is strong and durable. For example, for grain storage bins, the netting can be made of plastic coated steel cable while for grain carts it might be made of braided nylon or a similar material. The mesh is removably secured to the side walls of the grain storage bin or grain cart via a system of anchors attached about the periphery of the bin or cart. The wide mesh structure of the netting allows grain to freely drop through the netting into the bin or cart, yet prevents a person from intentionally or accidentally entering the bin or cart from above. The inventive method includes the steps of attaching a plurality of anchors to the sides of a grain storage bin or grain cart and then securing a wide mesh netting to the anchors such that it blankets the grain storage area to prevent human entry into the storage area from above, yet allows the free entrance of grain through the netting into the storage area.

OBJECTS AND ADVANTAGES OF THE INVENTION

The objects and advantages of the invention include: providing a grain storage safety netting system and method; providing such a system and method in which a series of anchors are attached to the inside periphery of a grain storage bin or grain cart; providing such a system and method in which a wide mesh netting is removably secured to the anchors in a position in which the netting blankets the top of the grain storage area of the bin or cart; providing such a system and method in which the netting allows the free ingress of grain into the storage area from above, while preventing human entry into the grain storage area from above; providing such a system and method which minimizes or prevents suffocation accidents involving grain storage bins or grain carts; and providing such a system and method which is reliable, easy to install, is economical to manufacture and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view of a stationary grain storage bin, with portions broken away to illustrate the placement of a netting system in accordance with the invention.

FIG. 2 is a greatly enlarged, fragmentary cross-sectional view of a portion of the grain bin, taken along line 2—2 of FIG. 1, and illustrating a side view of one of a plurality of net anchors secured to the corrugated side of the bin.

FIG. 3 is a greatly enlarged, fragmentary cross-sectional view of a portion of the grain bin, taken along line 3—3 of FIG. 2, and illustrating a top view of the net anchor of FIG. 3 along with a portion of wide mesh safety netting.

FIG. 4 is a cross-sectional view of the entire grain storage bin, taken along line 4—4 of FIG. 1, and illustrating the complete safety netting and anchor system.

FIG. 5 is a perspective view of a mobile grain cart equipped with a grain storage safety netting system in accordance with the present invention.

FIG. 6 is a greatly enlarged, fragmentary cross-sectional view of a portion of the grain cart sidewall, taken along line 6—6 of FIG. 5, and illustrating a top view of one of a plurality of net anchors secured to the side wall of the cart along with a portion of wide mesh safety netting.

FIG. 7 is a greatly enlarged, fragmentary cross-sectional view of a portion of the grain cart side wall, taken along line 7—7 of FIG. 6, and illustrating a side view of the net anchor of FIG. 6 with the safety netting secured thereby.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, and particularly FIGS. 1–4, a grain storage safety net system, generally indicated at 1 is attached to a grain storage bin 2. The safety netting system 1 includes a generally circular wide mesh net 3, with preferred opening sizes approximately 4" by 4". The net 3 is preferably constructed of woven steel cable 4 with a plastic coating 5. A plurality of net anchors 11 are arrayed about the inside periphery of a cylindrical side wall 12 of the bin 2 about 2–4 feet below a top 13 of the cylindrical side wall 12. This position allows a person to enter the bin 2 via a ladder 14, yet the net 3 prevents that person from entering the bin 2 far enough to be immersed in, and therefor suffocated by, a quantity of grain (not shown) stored in the bin 2. The wide mesh structure of the net 3 allows grain to freely pass through the net 3 but will not allow a person to pass there through. The net 3 is made of a circular peripheral cable 15 and a plurality of attached, criss-crossing cables 16.

FIGS. 2 and 3 illustrate details of one of the net anchors 11. FIG. 2 shows a number of corrugations 17 of the bin side wall 12, with the anchor 11 attached thereto. The anchor 11 includes a vertically oriented steel plate 21 of a length to cover a plurality of the corrugations 17, with a plurality of attachment bolts 22 and nuts 23 extending through the side wall 12 and through the plate 21. A pair of ears 24 are attached to and extend inward from the steel plate 21 about midway along the plate 21. The ears 24 are separated by a distance 25 sufficient to easily accommodate a diameter of one of the peripheral cable 15 of the net 3. Each of the ears 24 has a bore 32 extending vertically therethrough, with the bores 32 being aligned vertically to allow a keeper such as a retention bolt 33 to be placed therethrough inside the peripheral cable 15 to retain the peripheral cable 15 between the ears 24. A nut 34 is attached to the bolt 33 to hold it in place.

Referring to FIG. 4, the anchors 11 thus removably secure the safety net 3 via the peripheral cable 15 in a manner such that it blankets an entire upper opening 35 formed by the cylindrical side wall 12 to prevent human ingress therein.

FIGS. 5–7 illustrate a grain storage safety net system, generally indicated at 41, which is attached to a mobile grain cart 42. The safety netting system 41 includes a generally rectangular wide mesh net 43, with preferred opening sizes approximately 3" by 4". The net 43 is preferably constructed of attached strands 44 of, for example, braided nylon, but can be made of plastic coated stranded steel cable if additional strength is needed. A plurality of net anchors 51 are arrayed about an inside surface of each of four rectangular side walls 52–55, preferably about 18" to 24" below an upper surface of each of the side walls 52–55. Again, this position allows a person to access a generally rectangular top opening 61 of the cart 42, yet the net 43 prevents that person from entering the cart 42 far enough to be immersed in, and therefor suffocated by, a quantity of grain (not shown) stored in the cart 42. The wide mesh structure of the net 43 allows grain to freely pass through the net 43 but will not allow a person to pass there through. The net 43 is made of one or more peripheral cable(s) 56 forming a rectangle and a plurality of attached, criss-crossing cables 57.

FIGS. 6 and 7 illustrate details of one of the net anchors 51. Each anchor 51 includes a vertically oriented steel plate 62 of a length to accommodate a plurality of attachment screws 63 extending through the plate 62 and into the side wall 52. The plate 62 is bent in the middle to form a semi-circular protrusion 65 which extends inward into the cart 42. The protrusion 65 forms a recess 71 of a sufficient size to easily accommodate a diameter of the peripheral cable 56 of the net 43.

Referring again to FIG. 5, the anchors 51 thus removably secure the safety net 43 in a manner such that it blankets the entire upper opening 61 formed by the side walls 52–55 to prevent human entrance therein while allowing the free flow of grain there through.

While certain forms of the present invention have been illustrated and described herein, it is not to be limited to the specific forms or arrangement of parts described and shown. For example, the design of the anchors 11 and 51 is exemplary only and many other variations of attachments could be employed equally effectively. For example, the steel plates could be circular instead of rectangular, which would yield more surface area of attachment. The individual anchors could be replaced with a continuous anchoring system which extends entirely about the periphery of the bin or cart. The anchors 11 and 51 could be reinforced on the opposite side of the respective side walls 12 and 52–55. The nominal mesh opening sizes of the nets 3 and 43 can be any desired dimension, and the net material can be any suitable material as long as the mesh size and material strength are sufficient to prevent human ingress into the grain storage areas of the bin 2 or cart 42. Other variations will occur to those of skill in the art.

What is claimed is:

1. A grain storage safety netting system for a grain storage facility which has a side wall defining an interior volume, a cross section taken through the side wall defining an interior cross-sectional area and an upper opening for the ingress of grain, the upper opening being sized to allow the ingress and egress of a human being, and comprising:

a) a quantity of netting, said netting having an outer netting periphery and having openings sized to prevent a human from falling through the netting while easily permitting grain to fall therethrough;

b) an anchoring system attached to an inside surface of the side wall of the grain storage facility, said anchoring system securing the periphery of said netting in a position such that the netting covers substantially all of the interior cross-sectional area of said grain storage facility; and c) said anchoring system including a plurality of individual anchors positioned about the periphery of said storage facility with each said anchor removably securing a portion of said netting periphery such that said netting is supported entirely by engagement of said netting periphery with said anchors.

2. A grain storage safety netting system as in claim 1, wherein said system is installed in a stationary grain storage bin formed by a generally cylindrical side wall, wherein:

a. said netting is generally circular and is formed by an outer generally circular peripheral cable with attached, criss-crossing cables.

3. A grain storage safety netting system as in claim 2, wherein said anchoring system comprises a plurality of individual anchors spaced about the periphery of said storage facility with each said anchor removably securing a portion of said netting peripheral cable.

4. A grain storage safety netting system as in claim 2, said bin side wall being formed of corrugated metal, wherein each said anchor includes:

a. a rigid plate spanning a plurality of corrugations in the bin side wall;
   b. a pair of ears extending outward from said rigid plate, said pair of ears being separated a distance sufficient to accommodate said peripheral cable; and
   c. a keeper attached to the ears to retain said peripheral cable.

5. A safety netting system for a grain bin which is formed by a generally cylindrical side wall defining an interior volume, a cross section taken through the side wall defining an interior cross-sectional area and forming an upper circular opening for the ingress of grain, the upper opening being sized to allow the ingress and egress of a human being, and comprising:

a) a quantity of netting, said netting being generally circular and formed by an outer circular peripheral cable with attached, criss-crossing cables, said netting having openings sized to prevent a human from falling through the netting while easily permitting grain to fall therethrough;
   b) an anchoring system attached to an inside surface of the side wall of the grain bin, said anchoring system securing said peripheral cable of said netting in a position such that the netting covers substantially all of the interior cross-sectional area of the grain bin; and
   c) said anchoring system including a plurality of individual anchors positioned about said surface of the side wall of the grain bin with each said anchor removably securing a portion of said netting peripheral cable such that said netting is supported entirely by engagement of said peripheral cable with said anchors.

6. A grain storage safety netting system as in claim 5, the bin side walls being formed of corrugated metal, wherein each said anchor includes:

a. a rigid plate spanning a plurality of corrugations in the bin side wall;
   b. attachment means attaching said rigid plate to said side wall;
   c. a pair of ears extending outward from said rigid plate, said pair of ears being separated a distance sufficient to accommodate said peripheral cable; and
   d. a keeper attached to the ears to retain said peripheral cable portion.

7. a method of enhancing safety of a grain storage facility having a side wall defining an interior volume, a cross section taken through the side wall defining an interior cross-sectional area and an upper opening for the ingress of grain, the upper opening being sized to allow the ingress and egress of a human being, said method comprising the steps of:

a) attaching an anchoring system to an inside surface of a side wall of the grain storage facility, said anchoring system including a plurality of individual anchors positioned about a periphery of said storage facility; and
   b) connecting an outer netting periphery of a quantity of netting to said individual anchors of said anchoring system in a position such that said netting is supported entirely by engagement of said netting periphery with said anchors and covers substantially all of the grain storage facility interior cross-sectional area, said netting having minimum opening sizes which prevent a human being from passing therethrough while easily permitting grain to fall therethrough.

8. A method as in claim 7, wherein said grain storage facility is a generally cylindrical stationary grain storage bin, and wherein:

a. said connecting step includes connecting a quantity of netting which is generally circular and which is formed by an outer circular peripheral cable with attached, cross-crossing cables.

9. A method as claim 8, wherein said attaching step includes attaching a plurality of individual anchors spaced about the periphery of said storage bin and said connecting step includes removably connecting a different portion of said peripheral cable of said netting to each of said anchors.

\* \* \* \* \*